United States Patent [19] Kraus

[11] 3,920,908

[45] Nov. 18, 1975

[54] BUYER CREDIT SERVICE FOR A TELEPHONE SYSTEM

[76] Inventor: Constantine R. Kraus, 845 Mount Moro Road, Villanova, Pa. 19085

[22] Filed: June 25, 1974

[21] Appl. No.: 482,864

[52] U.S. Cl.......... 179/2 CA; 179/2 DP; 235/61.7 B

[51] Int. Cl.$^{2}$..................... H04M 11/04; G06K 5/00

[58] Field of Search. 179/2 CA, 2 DP, 18 B, 18 BE, 179/18 BD, 27 FH; 340/149 A, 152; 235/61.7 B

[56] References Cited

UNITED STATES PATENTS

| | | | |
|---|---|---|---|
| 2,902,541 | 9/1959 | Singleton | 179/2 CA |
| 3,704,346 | 11/1972 | Smith et al. | 179/18 BE |
| 3,719,927 | 3/1973 | Michels et al. | 340/152 R |
| 3,727,186 | 4/1973 | Stephenson et al. | 340/149 A |

*Primary Examiner*—Douglas W. Olms
*Attorney, Agent, or Firm*—Patrick J. Roche

[57] ABSTRACT

A credit center detachably connectible to a traffic service position system (TSPS) connecting calling and called telephone sets for enabling the calling set to obtain a service on credit from the called set in a telephone system wherein the credit center stores credit intelligence pertinent to the calling set. The calling set starts a call for such service by sending a prefix code followed by the telephone number of the called set to activate the traffic system to record therein signals identifying the class mark and the numbers of the called and calling sets. The traffic system responsive to the class mark and the calling and called set signals recorded therein activates the credit center to deliver the calling set credit intelligence therefrom to the called set for display thereat. The called set after evaluating such credit intelligence displayed thereat activates the traffic system to disconnect the credit center from the called set and to connect the called and calling sets together to complete the call from the calling set to the called set thereby enabling the calling set to obtain the service on credit therefrom. The called set may comprise an automated library, a merchandising mart, a shared-time computer, a data bank or the like.

22 Claims, 3 Drawing Figures

BUYER CREDIT SERVICE FOR A TELEPHONE SYSTEM

BACKGROUND OF THE INVENTION

This invention relates to a method of and a credit center for expeditiously enabling one party to obtain a service on credit from another party when both parties are geographically separated, and more specifically to such method and credit center adapted for promoting sales transactions on credit between calling and called parties in a telephone system.

Modern merchandising techniques are designed to permit a person to obtain a copy of an item, purchase an article or a personal service or the like on credit in a simple manner in a face-to-face transaction by merely exhibiting a validated credit card in place of cash. In situations where the buyer and seller are geographically separated as in a telephone system, a problem heretofore has been to provide the called seller at the moment with adequate information regarding the credit integrity of the calling buyer attempting to make a purchase on credit. The availability of such information to the called seller is imperative for the latter in order for him to make a quick decision at the moment whether to accept or reject the telephone purchase on credit. Also, this information is urgently needed by the called seller in telephone sales so that poor credit risks may be instantly recognized for minimizing and obviating financial losses in such sales, and further so that credit risks may be quickly evaluated and avoided for increasing profits in such sales.

Therefore, it is contemplated by the present invention to provide a credit center for expeditiously retrieving therefrom credit intelligence including credit card information pertinent to a calling buyer and thereafter displaying such intelligence to a called seller before the calling buyer is connected with the called seller for the purpose of tendering an offer to purchase a service on credit in a telephone system. This visual credit intelligence display enables the called seller to make a quick determination at the moment whether to accept or reject such credit purchase before the offer is actually tendered by the calling buyer to the called seller.

Accordingly, it is a principal object of the present invention to provide a called seller with substantially instant credit intelligence pertinent to a calling buyer wishing to obtain credit in a sales transaction handled in a telephone system.

Another object is to provide for a called seller a visual display of credit intelligence pertinent to a calling buyer, before the buyer is connected to the seller, in a sales transaction requiring credit for the buyer in a telephone system.

A further object is to minimize for a seller the possibility of financial loss arising from a purchase requiring credit for the buyer in a telephone sales transaction.

An additional object is to increase for a seller the possibility of financial profit resulting from a purchase involving credit for the buyer in a telephone sales transaction.

A still additional object is to provide a called party, in the absence of supplementary credit information, with the name, the address and the telephone number of a calling party, without assistance from the calling party, in a telephone system.

A still further object is to insure the called party that the telephone number, the name, and the address of the calling party are the same as those recorded in a pertinent telephone listing in a telephone system.

SUMMARY OF THE INVENTION

The foregoing and other objects of the invention are achieved in accordance with a specific embodiment of the invention in FIGS. 1, 2 and 3, illustrating an instant credit center independent of but designed to function on an automatic basis in a modern automatic telephone system, and provided with credit intelligence pertinent to a calling telephone set embodied in a calling station. This calling set originates a call for service on credit to be supplied by a called station having a called telephone set and comprising for example, an automated library, a merchandising mart, a time-shared computer, a data bank or the like. Both the calling and called stations and the respective calling and called sets therein are connectible together through sending and receiving telephone central offices and a traffic service position system (TSPS) office all of which are controlled by predetermined signals originating at the calling set for recording in the TSPS office. These signals are utilized by the TSPS office for activating the credit center to locate the calling set credit intelligence therein and for connecting the credit center to the called set to deliver the calling set credit intelligence as located in the credit center to the called station.

The calling set desirous of obtaining a service on credit such, for example, as ordering a copy of a catalogue item in the automated library, purchasing an article from the merchandising mart, a specific time interval in a time-shared computer, a data bank or the like starts a call therefor by going off-hook and transmitting a predetermined prefix number of signals followed by another predetermined number of signals identifying and preselecting the called set to which the call for service on credit is directed. These signals activate the sending control office to connect the calling set therethrough to the TSPS office. The sending office responsive to its connection to the TSPS office now automatically transmits a class mark signal and thereafter additional signals identifying the number of the called and calling sets to the TSPS office. This office recognizes and records the class mark signal as an incoming credit call from the calling set for an indication of the credit intelligence pertaining thereto and in addition records the signals identifying the respective numbers of the called and calling sets as received.

Pursuant to the recorded class mark signal the TSPS office establishes a voice circuit incoming to the credit center and including the TSPS office therein. Now, on this circuit the TSPS office transmits signals representing the called and calling sets to the credit center for recording therein. Thereafter, the TSPS office utilizes the called set signals stored therein to establish a voice signaling circuit outgoing from the credit center and including the credit center, the TSPS office, the switching office, the receiving central office, and the called station having the called set therein.

During the time interval in which the TSPS office is establishing the outgoing voice circuit from the credit center to the called station, the credit center responsive to the calling set signals recorded therein searches for the credit intelligence stored therein and pertinent to the calling set, and upon locating such intelligence transmits it over the latter outgoing circuit to the called station for visual display to an attendant thereat. Upon an evaluation of the displayed credit intelligence at the called station as adequate or inadequate, the attendant thereat decides whether to accept or reject the incoming call for credit service originating at the calling set as previously noted. If the credit intelligence as so displayed were deemed to be inadequate, the attendant at the called set may go on-hook to terminate the call or as an alternative may discuss the credit intelligence with an attendant at a telephone set in the credit center for further clarification before a final determination is made by the called set attendant with respect to a final disposition of the incoming credit service request. In cases where no supplementary credit information is available, the credit center sends only the name, the address and the telephone number of the calling party for display to the called party. These stored in a memory at the credit center and obtained from the telephone company would be adequate in many cases to provide credit for such simple services as data on train and airplane schedules or the like for which the charge would be minimal.

Assuming now the displayed credit intelligence at the called station is adequate, the attendant thereat sends a disconnect-credit center signal to the TSPS office which first operates to complete a voice circuit between the sending and receiving central offices and thereby between the calling and called sets, and second to disconnect the credit center from the TSPS office. This completes the call from the calling set to the called set whereby the calling set is enabled to transmit orally its request to the called set for service on credit to include a copy of a catalogue item from the library, a copy of a railroad or airline schedule, the purchase of an article from the merchandising mart, or the like. In the case of the copy of the library item, or the railroad and airline schedules the called and calling stations contain compatible transmitting and receiving equipments, respectively, to effect the transmission and reception of electric signals representing a copy of the requested item. On the other hand, in the event of the purchase of an article, the delivery thereof may be determined in the oral communication between attendants at the calling and called sets.

It is noted that during the time interval in which the TSPS office functions to interconnect the credit center and the called station for the purpose of transmitting the credit intelligence from the credit center to the called station, the calling set is merely at stand-by and awaiting completion of its call to the latter station. This stand-by interval or delay time enables the called party to obtain the visual indication of the credit integrity of the calling party as supplied by the credit center before the latter party is permitted to place orally his request for credit service with the called party.

The credit intelligence regarding the calling set as recorded in the credit center and displayed at the called station only upon a request from the calling set may comprise the name, the address and the telephone number, supplemented by such additional credit intelligence as a credit card number or other data deemed by the calling party as insuring an instantly favorable response from the called seller.

In a sending telephone central office wherein the mark signal is not automatically transmitted by the sending office as previously mentioned, the calling party initially transmits an O (operator) signal, followed by the predetermined number of signals identifying the called party, whereby a telephone set at the TSPS office is connected in a voice circuit to the calling set for enabling the calling party to state orally to the TSPS office attendant a desire to obtain a service on credit from the called party. Thereafter, the sending office automatically transmits signals identifying the numbers of the calling and called sets for recording in the TSPS office as hereinbefore stated. Now, the TSPS office attendant provides manually a local signal to activate the TSPS office to connect the credit center therewith, and thereafter returns the TSPS office set to on-hook. From this point on, the operation of the invention is identical with that previously explained.

BRIEF DESCRIPTION OF THE DRAWING

The invention is readily understood from the following description when read together with the accompanying drawing in which.

DETAILED DESCRIPTION

Figure 1:
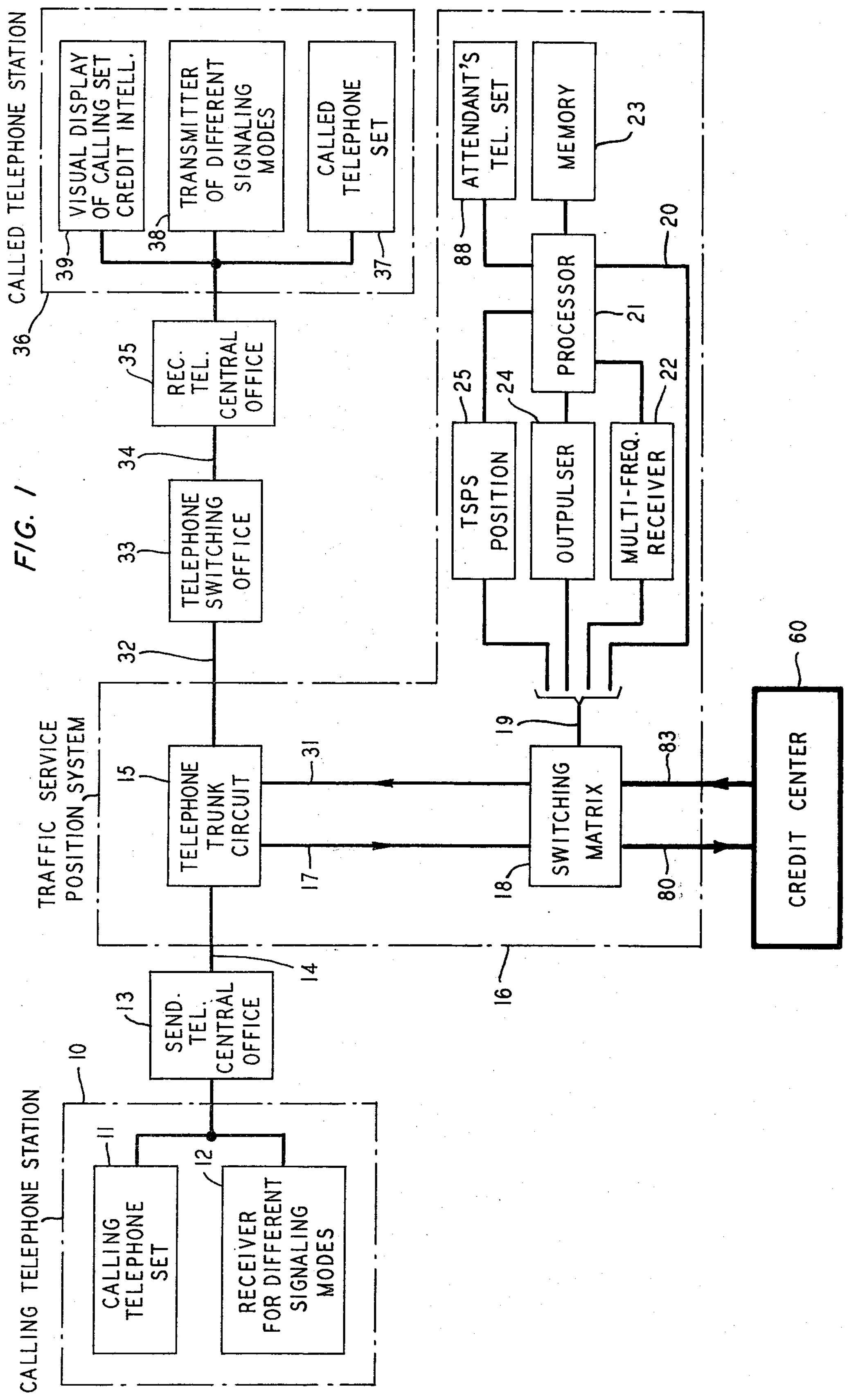
FIG. 1 is a block diagram of a specific embodiment of the invention shown in heavy lines as utilized in a telephone system.

FIG. 1 shows a conventional telephone system comprising a calling station 10 including a telephone set 11 and a receiver 12 adaptable for different signaling modes. These, not shown, may include a teletypewriter, dataphone, dial, digital code device, facsimile, audio recorder, slowscan TV, video display, and the like for a purpose that is hereinafter mentioned. This set and receiver are connected via a local sending telephone central office 13 and a CAMA (centralized automatic message accounting) telephone trunk 14 to a first input of a telephone trunk circuit 15 included in a No. 1 TSPS (traffic service position system) office 16. This office is well-known in the telephone art as disclosed in an article entitled TSPS No. 1 System-Organization and Objectives by Jaeger and Joel, Vol. 49 Bell System Technical Journal, Dec. 1970, No. 10, pages 2,435 and 2,436; and in an article entitled TSPS No. 1 — Operational Programs — ANI (automatic number identification) Digit Analysis by Kettley, Pasternak and Sikorsky, Vol. 49, Bell System Technical Journal, Dec. 1970, No. 10, page 2,632. The receiver is normally not a component of a conventional calling telephone station but is included therein as a part of the present invention for a purpose that is hereinafter explained. The operations of the trunk 14 and the TSPS office are further discussed below.

For the purpose of this description the sending central office is assumed to be a component of an existing telephone system such, for example, as the No. 1 ESS (electronic switching system) system including a stored program control as disclosed in the Bell Laboratories Record, June 1965. As an alternative, this sending office may comprise either a No. 1 or a No. 5 crossbar switching system manufactured by the Western Electric Company and having originating registers to recognize prefix digits for routing an incoming call to the TSPS office for a purpose later explained.

A calling party wishing to make a service call on credit operates his set to off-hook and awaits dial tone sent from the sending central office and thereafter upon reception of such tone sends a predetermined prefix code signal consisting of two or three digits in signal form, followed by a telephone number including seven or ten digits in signal form signifying a local or distant preselected called telephone set for a purpose identified hereinafter. The prefix signal and the called set number signals are transmitted in sequence as an incoming call to the local sending central office in which register-sender means, or an appropriately similar device commonly used in the modern telephone plant but not shown herein in the interest of a simplified disclosure, records the signals identifying the called set and other signals identifying the calling set. This office responsive to the prefix code routes the incoming call directly to the trunk 14 assigned to the trunk circuit 15 in the TSPS office.

Referring again to FIG. 1, it is seen therein that the TSPS office further includes the trunk circuit 15 having a first output extending via a signaling channel 17, a switching matrix 18 and signaling leads 19 and 20 to a processor 21. Seizure of the telephone trunk circuit 15 provides a signal over a first circuit including the local sending office, trunk 14, trunk circuit 15, channel 17, switching matrix 18, leads 19 and 20 and the processor. Responsive to this signal, the processor produces a signal on leads 20 and 19 to actuate the switching matrix 18 to connect the signaling channel 17 to a multi-frequency receiver 22. Upon the completion of this connection the processor sends a signal over leads 20 and 19, switching matrix 18, signaling channel 17, trunk circuit 15 and trunk 14 to the sending central office. This office responsive to the receipt of the connection signal of the MF receiver 22 as just mentioned transmits in the first circuit a signal of a preassigned frequency supplied by a conventional generator, not shown, and representing a class mark and thereafter, upon receipt of an appropriate start signal from the TSPS office, transmits additional signals identifying the called number and the calling number in sequence to the MF receiver 22 for storage in a programmed memory 23. This is known as essentially ANI (automatic number identification) and is a component of the CAMA trunk 14 provided as an adjunct to the TSPS office, as previously noted. Except for the transmission of the class mark signal for a purpose explained hereinafter, the foregoing operation is essentially the operation of the TSPS office with regard to the O (operator) signal plus appropriate signals. Also, the TSPS office includes an outpulser 24 and a TSPS position 25 whose operations are later explained.

FIG. 1 also shows a telephone voice channel 31 included in the TSPS office and connected to a second input of the trunk circuit 15 whose second output is connected via telephone trunk 32, telephone switching office 33, telephone trunk 34 and a local receiving telephone central office 35 to called station 36. This station showing a simple circuit structure includes a telephone set 37, a transmitter 38 of different signaling modes compatible with those previously mentioned in connection with the receiver in the calling station, and a visual display 39. This may be a typical cathode ray tube as presently utilized at airline reservation desks, railroad ticket offices, and the like, wherein the data required therefor are sent over ordinary telephone lines to the electronic tube for visual display thereon. The telephone switching office 33 may be a suitable type such, for example, as the No. 4A toll crossbar switching office manufactured by the Western Electric Company. It is understood that the telephone trunk and the sending and receiving central offices connecting the calling and called stations may comprise the number, the arrangement, and the types disclosed in my U.S. Pat. No. 3,728,486 issued Apr. 17, 1973. The transmitter and the visual display are normally not components of a convential called telephone station but are included herein as parts of the present invention described subsequently.

Figure 2:
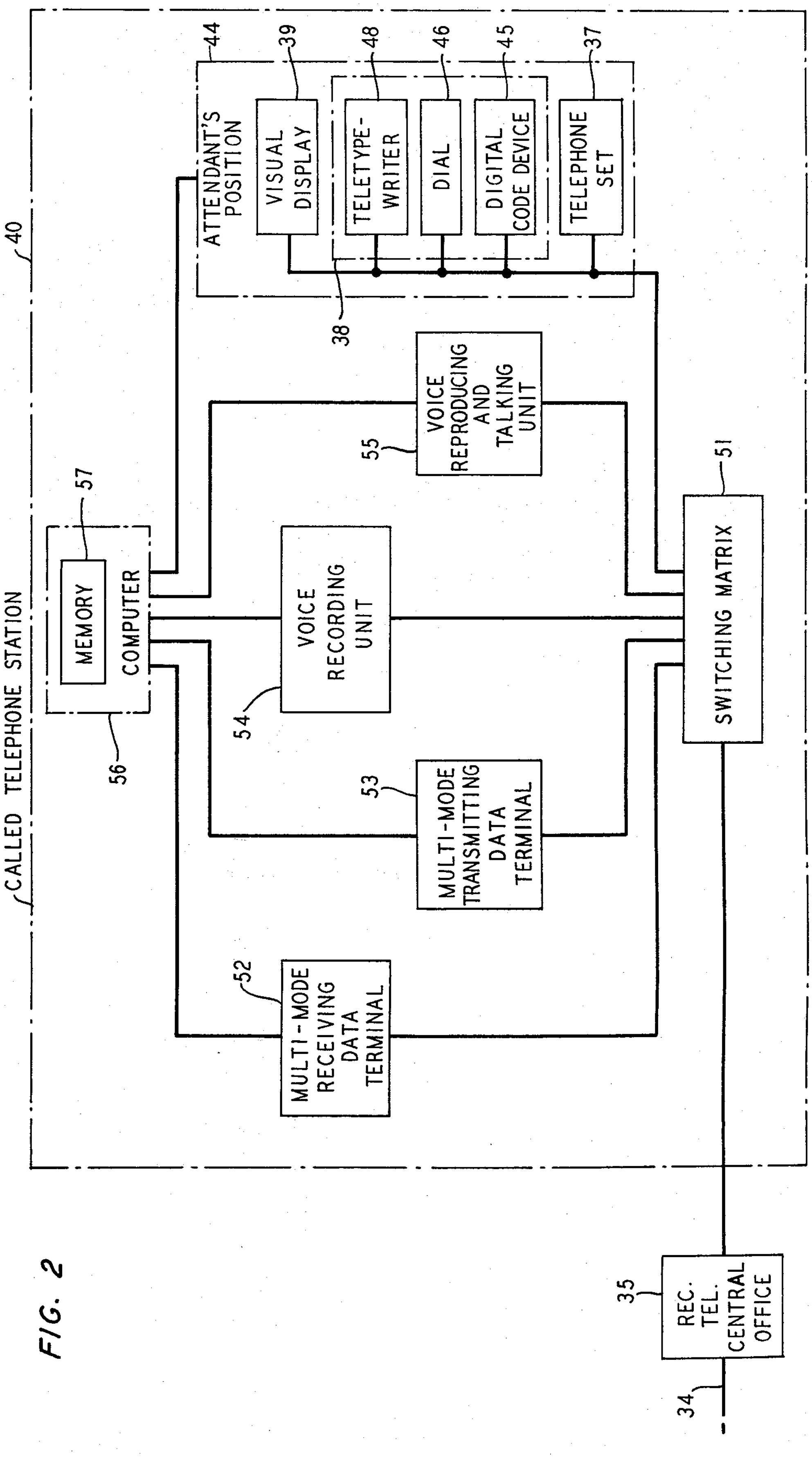
FIG. 2 is a block diagram showing the components constituting a called telephone station in FIG. 1.

FIG. 2 shows a called telephone station 40 substituted for the called telephone station 36 in FIG. 1 and comprising a sophisticated circuit structure including an attendant's position 44, embodying telephone set 37, transmitter 38 of different signaling modes consisting of, for example, a telephone digital code device 45, a telephone dial 46, and a teletypewriter 48, and the visual display 39. With regard to the different transmitting signaling modes just enumerated and comprehended by the transmitter 38 in FIG. 1, it is understood that the receiver for different signaling modes as shown in the calling station in FIG. 1 is compatible therewith in a signaling sense for a purpose that is subsequently explained. FIG. 2 also contains a switching matrix 51, a multi-mode receiving data terminal 52, a multi-mode transmitting data terminal 53, a voice recording unit 54, a voice reproducing and talking unit 55, and a programmed computer 56 having a well-known structure and including a memory 57 of familar design. The latter matrix, terminals and units are normally not components of a conventional called telephone station but are included herein as parts of the present invention described below. The operation of the called station as just mentioned is subsequently described.

The recording unit 54 records the voice of the calling party, if such is desired. This voice record may be compared with a voice record of such party on file at the called station; or it may be transmitted by the reproducing and talking unit 55 to a voice reproducing and talking unit 66 at the credit center in FIG. 3 for comparison with the voice record of the calling party thereat, if such is desired. The reproducing component of the unit 55 reproduces the voice record of the calling party for comparison with the calling party voice record, if on file, as the calling party is speaking. This provides a further check on the identity of the calling party. The talking component of the unit 55 advises the calling party of a delay when the called party operator is not yet available to talk with the calling party. The programmed computer 56 directs the performance of such switching operations as: answer the incoming call, transmit a signal to the credit center to initiate the transmission of data therefrom, check display of received data on display 39, search for credit information filed at the called station and pertinent to the calling party and transmit the latter information to the display 39 for comparison with information received thereat from the credit center as explained later.

In accordance with a specific embodiment of the invention shown in heavy lines in FIG. 1 and in detail in FIG. 3 as hereinafter mentioned, a credit center 60 is initially connected to the TSPS office in response to the class mark signal received thereat, and thereafter the called and calling set identifying numbers recorded in the TSPS office are transmitted to the credit center for recording therein. Subsequently, the calling set identifying number recorded in the credit center serves to activate the credit center to locate therein the credit intelligence pertinent to the calling set number. At the same time the TSPS office responsive to the called set number recorded therein connects the credit center to the called station for displaying thereat the credit intelligence pertinent to the calling set as located in the credit center and delivered to the called station therefrom. Pursuant to the adequacy or the inadequqncy of such displayed credit intelligence, the called set may accept or reject the call incoming for credit service from the calling set which is still off-hook awaiting a connection through the several telephone networks to the called set, as hereinafter mentioned. Further operation of the invention as above mentioned for the foregoing purpose is now explained.

Figure 3:
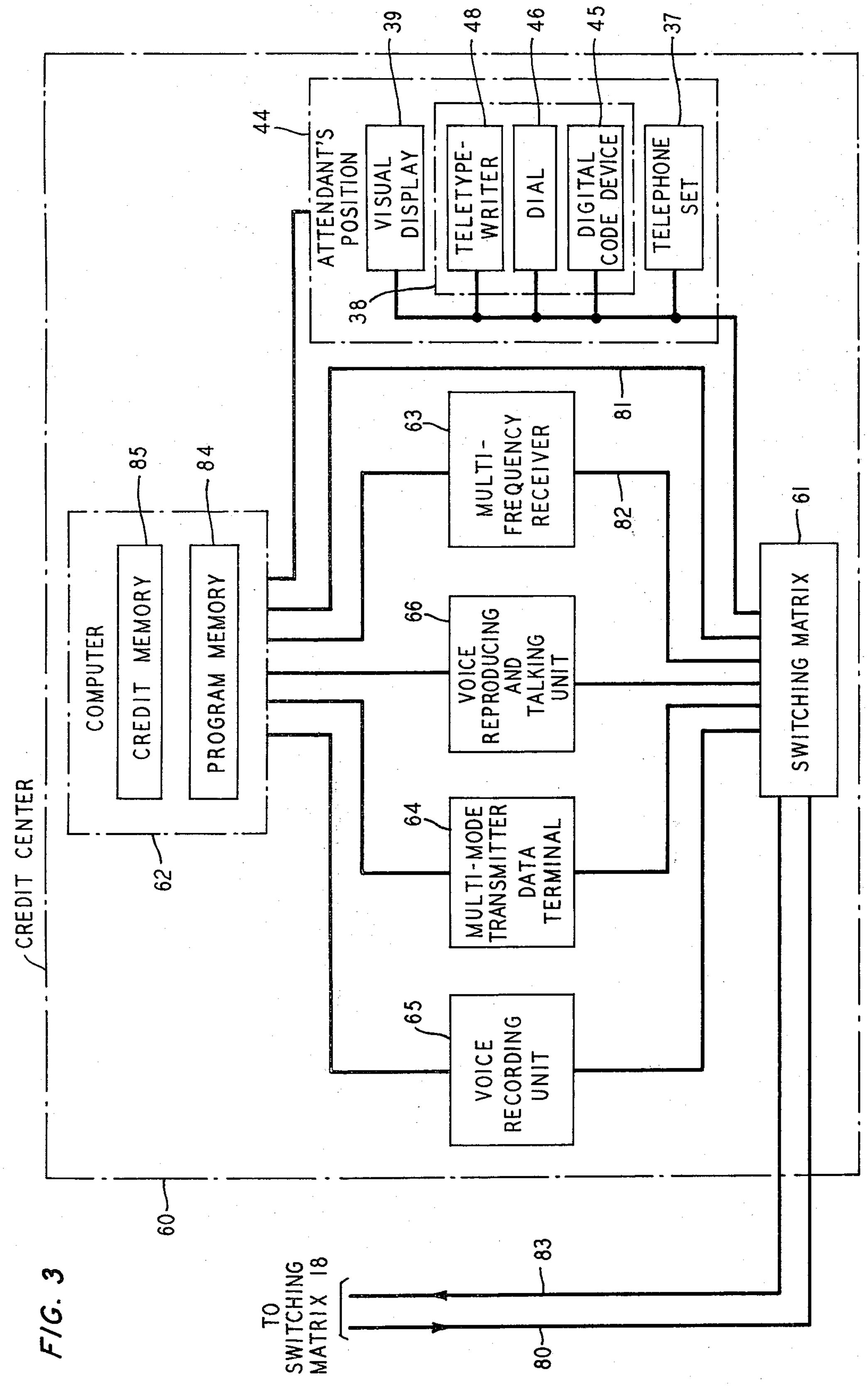
FIG. 3 is a block diagram showing the components constituting the specific embodiment of the invention in FIG. 1.

FIG. 3 delineates the credit center consisting of a switching matrix 61, a computer 62, a multi-frequency receiver 63, a transmitter multi-mode data terminal 64, a voice recording unit 65, a voice reproducing and talking unit 66, and an attendant's position 44 including the visual display 39, the transmitter 38 comprising the teletypewriter 48, the telephone dial 46, and the digital code device 45, and a telephone set 37. Units 65 and 66 are identical with units 54 and 55, respectively, in FIG. 2, except the talking component of the unit 66 advises the called party attendant of a delay at the credit center. Recording unit 65 records the voice of the calling party as received from the called station, if such is desired. The reproducing component of the unit 66 reproduces the voice record of the calling party as received from the called station for comparison with voice record of the calling party, if on file, at the credit center.

Recalling the previous explanation, it is noted again that the calling set going off-hook is desirious of obtaining on credit, for example, a copy of an item from the automated library, a copy of a railroad or airline schedule, the purchase of an article or a service from the merchandising mart, to reserve a specific time period in the time shared computer or a data bank, or the like. Also, at this time it is recalled that the class mark signal signifying a credit call and the identifying numbers of the calling and called sets are stored in the memory 23 of the TSPS office as hereinbefore stated.

Now, the processor responsive to the class mark activates the switching matrix 18 to interrupt the first circuit by disconnecting the channel 17 therefrom and to establish a second circuit consisting of switching matrix 18, voice channel 80, switching matrix 61, voice channel 81 extending to programmed computer 62, and lead 82 extending to multi-frequency receiver 63 which is also connected to the latter computer. This energizes the set 37 to go off-hook in the attendant's position 44 in the credit center for a purpose explained later and causes the computer 62 to transmit a signal indicating the completion of the second circuit. The processor responsive to the receipt of such signal from the credit center for indicating the connection of the receiver 63 in the second circuit just traced activates the switching matrix 18 via leads 19 and 20 to connect the outpulser to the switching matrix 18 in the second circuit. Upon completion of the latter connection, the processor actuates the outpulser to transmit from the memory 23 other signals corresponding to those recorded therein and identifying the calling and called sets to the receiver 63 in the second circuit as just identified for a purpose that is presently mentioned.

Upon the completion of the signal transmission to the receiver 63 in the second circuit as just stated, the processor further activates the switching matrix over leads 20 and 19 to connect channel 83 from the credit center through the switching matrix 18, channel 31, trunk circuit 15 and trunk 32 to the switching office. Upon the completion of the latter connection, the processor activates the outpulser 24 to transmit from the memory 23 other signals corresponding to those recorded therein and identifying the called set to the switching office through lead 19, switching matrix 18, channel 31, trunk circuit 15, and trunk 32. These signals energize the switching office to connect the receiving central office and the called station thereto whereby a third circuit is established between the credit center and the called station to include the computer 62 and the switching matrix 61 of the credit center, channel 83, switching matrix 18, channel 31, trunk circuit 15, trunk 32, switching office 33, trunk 34, receiving central office 35 and the called station. Upon the establishment of the third circuit just identified, the receiving terminal 52 at the called station signals appropriately to the transmitter terminal 64 of the credit center to acknowledge the connection therewith. Also, the called set is energized and goes off-hook to enable an attendant thereat to acknowledge orally a connection with an attendant at the credit center through the off-hook set thereat as previously stated for a purpose mentioned hereinafter.

During the time interval required to establish the above-identified third circuit between the credit center and the called station the programmed memory 84 responsive to the calling set identifying number signals received from the TSPS office searches the credit memory 85 for the credit intelligence stored therein and pertinent to the calling set. Upon locating this credit intelligence, the computer 62 actuates the transmitting data terminal 64 as controlled by a preselected one of the signaling modes included therein and including teletypewriter, dial and digital code device to transmit such pertinent credit intelligence in the third circuit to the receiving data terminal 52 in the called station. The output of the latter terminal is directed via programmed computer 56 to the visual display 39 for visual display thereon at the called station. At the same time, the identical credit intelligence is also exhibited on the visual display 39 in the credit center. This enables the attendants at the off-hook sets in the respective credit center and called station to discuss via the third circuit and another circuit hereinafter identified the substance of the credit intelligence as visually displayed at both thereof. Program memory 84 controls the sequence of operations for normal credit call, and determines whether the data are satisfactory and whether the attendant's position 44 at the credit center should be activated for help. Program memory 84 operates the switching matrix 61 to connect the various equipments in circuit, when required, routes calls, and data flow in the credit center.

The modes of the foregoing credit intelligence transmission and reception may comprise, for example, frequency shift keying at a rate of 2,000 bits per second. The pertinent credit intelligence as preselected may include, for example, the telephone number of the calling party, the name and address of the calling party, credit card information and identification, together with such further credit data that may have been furnished previously by the calling party to the credit center for storage in the credit memory of the computer therein.

Now the attendant at the called station, i.e., the called party at the called set evaluates the credit intelligence shown on the visual display thereat. This attendant recognizes the adequacy of such credit intelligence by sending an appropriate disconnect-credit center signal via the another circuit mentioned above and including the called set and the switching matrix at the called station, the receiving central office, the trunk 34, the switching office, and the trunk 32 of the telephone network, the trunk circuit 15, the channel 31, the switching matrix 18, the multi-frequency receiver 22 and the processor 21 of the TSPS office. This signal comprises a multi-frequency code say, for example, 2 or 3 digits repeated say, for example, twice and recognized by the TSPS memory 23 which is programmed therefor. Responsive to this signal, the TSPS office, firstly, activates the switching matrix 18 to connect the channels 17 and 31 together therein, while still timing the connection of the calling party to the called party, and secondly, sends a normal disconnect signal via the outpulser 24, the switching matrix 18, and the channels 80 and 83 to actuate the switching matrix 61 to disconnect both latter channels therefrom thereby disconnecting the credit center from the TSPS office. This interrupts the aforementioned second and third circuits. As a consequence, the credit center set goes on-hook. For the foregoing purpose, the multi-frequency receiver 22 remains connected through the switching matrix 18 to the called station, after the connection of the channels 17 and 31 in the latter matrix, in order to receive the disconnect-credit-center signal from the called station.

On the other hand, if and when the called station attendant evaluates the credit intelligence shown on the visual display at the called station as inadequate and while the called station and credit center attendant's positions are interconnected for voice communication via the circuit just identified, then the called station attendant's position (FIG. 2) may employ the signaling equipment thereat to request the credit center attendant for clarification, evaluation or additional checking of the latter displayed credit intelligence. For the purpose of effectuating such clarification and checking, the credit center attendant's position may utilize the signal equipment included therein. Also, at this time, the calling station credit intelligence as located in said credit center and delivered to the called station is simultaneously displayed on the visual displays 39 at both the called station and the credit center.

Before the disconnection of the channels 80 and 83 from the credit center as previously stated, the last-mentioned actuation of the switching matrix 18 serves to interconnect channels 17 and 31 therethrough and thereby to interconnect the calling and called sets in a fourth circuit including the calling station, the sending central office, trunk 14, trunk circuit 15, channel 17, switching matrix 18, channel 31, trunk circuit 15, trunk 32, the switching office, trunk 34, the receiving central office, and the called station. It is thus apparent that the call started at the calling set and directed to the called set as hereinbefore mentioned is now completed thereto. It is also recalled at this time that the respective calling and called sets are both off-hook as previously explained for voice communication therebetween in the fourth circuit just traced while at the same time the transmitter and the receiver in the respective called and calling stations are interconnected for compatible signaling modes for a purpose that is subsequently described. At this time, it is noted that when the credit center and the called station are interconnected in the third circuit identified hereinbefore for simultaneously exhibiting the credit intelligence pertinent to the calling set at both the called station and the credit center, the calling set is held in a stand-by state, although the latter set remains connected to the sending telephone network including the sending central office. Further it is noted that when the calling and called stations are interconnected in the aforeidentified fourth circuit, the credit center is disconnected from the called station due to the interruption of both the second and third circuits as previously stated.

As the calling and called sets are now interconnected at off-hook for voice communication purposes therebetween and since the credit intelligence of the calling set has been evaluated as adequate by an attendant at the called set, an attendant at the calling set may now state vocally to the attendant at the called set the specific service on credit that is required therefrom. This service is among those available at the called set as previously identified. Assuming, for example, the desired service involves a copy of a printed item, such, for illustration, as a printed article, a time schedule, a picture or the like, then signals representing the item as related thereto in a well-known manner, not shown, and determined by one of teletypewriter, dial or digital code device signaling modes as preselected by the calling set attendant are sent from the transmitter at the called station essentially on the fourth circuit as previously traced. These signals are received at the calling station by the receiver adjusted to a compatible signaling mode by the attendant thereat. Thereafter, the received signals are translated by a suitable device, not shown, into a copy or reproduction of the assumed library item. In the case of a data bank or a time-shared computer, appropriate data signals originating at the calling station are sent over the fourth circuit to the called station for use thereat in the well-known manner, not shown. Obviously, an article purchased from the called station serving as a merchandising mart would be hand-delivered to a geographical location as directed by the attendant at the calling set.

It is understood that the numbers of the calling and called sets as recorded in the TSPS office and in the credit center remain therein for familar telephone accounting purposes with regard to the foregoing services.

The called station may further include, for example, the following additional services:

1. To listen to a voice recording of a program prerecorded on a voice recording unit 54. This may be supplied from the latter unit by the attendant at the attendant's position 44 via appropriate activation of the computer 56 and the switching matrix 51 in FIG. 2.
2. To receive a particular video and audio program derived from a special video loop from the nearest central office or CATV circuit, or radio link, not shown.
3. To view a copy of a chart transmitted via facsimile in a voice-video mode, not shown.
4. To view a copy of a transportation schedule sent in a voice-video mode, not shown.

To store data in a data bank, not shown.

It is understood that the attendants at the respective called and calling stations would (a) discuss the requests via the respective off-hook telephone sets thereat, and (b) thereafter transmit and receive the requested copies by selecting compatible signaling modes from those previously mentioned and shown in FIGS. 1 and 2.

In telephone systems in which the sending central office in FIG. 1 is not an ESS type as it was hereinbefore assumed to be, then the calling station sends initially a signal O (operator) and thereafter the predetermined number of signals identifying the called set or station as hereinbefore mentioned. Again, signals identifying the telephone numbers of the respective calling and called sets are automatically transmitted from the sending central office for recording in the receiver 22 of the TSPS office as previously explained, except now the class mark signal is not sent at all. In lieu thereof, in the normal operation of the TSPS office the attendant's TSPS position 25 and the attendant's telephone set 88 are automatically connected in circuit with the calling set, wherein the latter attendant's set goes off-hook. This position functions only for credit calls originating at nonelectronic central offices. This enables the attendant at the TSPS office set to request the wish of the attendant at the calling set which has remained off-hook.

At this time the calling set attendant informs the TSPS office set attendant that he wishes to order a specific service on credit from the called set as previously explained. This causes the TSPS office set attendant to activate the memory and thereby the processor which thereupon energizes the switching matrix 18 to interrupt the afore-described first circuit by disconnecting channel 17 therefrom and at the same time to essentially establish the second circuit described above and including the processor, the outpulser 24, the switching matrix 18 in the TSPS office, the voice circuit 80, and the switching matrix 61, channel 82, receiver 63 and the computer 62 in the credit center. Now, the telephone set of the credit center goes off-hook, and the computer 62 signals the processor of the completion of the second circuit. Thereafter, the processor actuates the outpulser to transmit from the memory 23 the signals identifying the calling and called sets in the second circuit to the receiver 63 in the credit center so that the operation of FIGS. 1, 2 and 3 for ordering the specific service on credit in accordance with the invention herein is identical with that previously described. The memory 23 thus provides the software instructions required to effect the transfer of the credit call originating in the non-credit center to the electronic central office as just explained.

It is understood that the invention herein is described in such respects as are illustrative of the operation thereof. Other arrangements may be devised by those skilled in the art without departing from the spirit and scope of the invention.

What is claimed is:

1. In combination with a telephone system comprising:

a calling telephone station;

sending central office means;

a called telephone station;

receiving central office means; and traffic service position system means interposed between said sending and receiving office means to record signals identifying the numbers of said respective calling and called stations as transmitted from said sending office means activated by a predetermined number of signals originating at said calling station as a call for said called station to obtain a service on credit therefrom; said traffic means also receiving a signal indicating said service credit call thereat;

a credit center storing preselected credit intelligence pertinent to said calling station number;

said traffic means utilizing said calling station number signals recorded therein in response to said service credit call signal received at said traffic means for activating said credit center to locate therein said preselected credit intelligence pertinent to said calling station number;

said traffic means also utilizing said called station number signals recorded therein to connect said credit center through said traffic means and said receiving office means to said called station to deliver from said credit center to said latter station said preselected credit intelligence pertinent to said calling station number as located in said credit center for display at said called station; and said called station responsive to said preselected credit intelligence displayed thereat to activate said traffic means to disconnect said credit center therefrom and to interconnect said sending and receiving office means and thereby to interconnect said calling and called stations to complete said call from said calling station to said called station for enabling said calling station to obtain said service on credit from said called station.

2. The combination according to claim 1 in which said sending office means responsive to said predetermined number of signals originating at said calling station transmits said service credit call signal to said traffic means for recording therein and thereafter transmits said calling and called station number identifying signals from said sending office means to said traffic means for recording therein.

3. The combination according to claim 2 in which said traffic means responsive to said service credit call recorded therein connects said credit center thereto, and thereafter said traffic means responsive to the connection of said credit center thereto transmits said calling station number signals recorded in said traffic means to said credit credit center for recording therein; said credit center activated by said last-mentioned signals recorded therein locates in said credit center said preselected credit intelligence pertinent to said calling station number.

4. The combination according to claim 3 in which said traffic means responsive to the completion of the transmission of said calling station number identifying signal to said credit center utilizes said called station number identifying signals recorded in said traffic means to connect said credit center through said traffic means and said receiving office means to said called station for enabling said credit center to deliver said preselected credit intelligence as located therein to said called station.

5. The combination according to claim 4 in which said called station responsive to said preselected credit intelligence delivered thereto transmits a disconnect-credit center signal to said traffic means which responsive thereto disconnects said credit center therefrom and interconnects said sending and receiving office means together at said traffic means and thereby interconnects said calling and called stations.

6. The combination according to claim 5 in which said called station includes a pre-identified item of which said calling station preselects a copy thereof as said service on credit from said called station; said called station also includes a transmitter for transmitting signals related to said item through said receiving office means, said traffic means and said sending office means to said calling station, said latter station having a receiver to receive said signals as transmitted from said transmitter for representing said item copy at said calling station.

7. The combination according to claim 6 in which said credit center includes an attendant telephone position for permitting, between said called station and said credit center attendant position, an evaluation of said credit intelligence displayed at said called station as said latter credit intelligence is also simultaneously displayed at said credit center attendant position before said called station is connected to said calling station and thereby before said transmitter is connected to said receiver.

8. The combination according to claim 1 in which said traffic means includes a telephone set; said calling station is operated to send signal O (operator) as said service credit call signal followed by said predetermined number of signals for activating said sending office means to interconnect therethrough said calling station and said traffic means set so that said set is energized to permit from said calling station to said traffic means set a vocal indication of said call for service on credit from said calling station to said called station and further so that said sending office means transmits said calling and called station number identifying signals to said traffic means.

9. The combination according to claim 8 in which said traffic means responsive to said vocal credit call indication thereat connects said credit center thereto.

10. The combination according to claim 3 in which said credit center includes a computer consisting of a credit memory and a programmed memory; said traffic means responsive to said service credit call signal recorded therein connects said traffic means to said computer; said programmed memory responsive to said calling station number identifying signals received at said computer actuates said credit memory to locate therein said preselected credit intelligence pertinent to said calling station identifying number.

11. In combination with a telephone system including:

a calling telephone station;

sending central office means;

a called telephone station;

electronic apparatus for visually displaying preselected information at said called station;

receiving central office means; and traffic service position system means interposed between said sending and receiving office means; said traffic means establishing a first circuit including said sending office means and said traffic means to record in said traffic means signals identifying the numbers of said calling and called station and transmitted in said first circuit by said sending office means activated in response to a predetermined number of signals originating at said calling station as a call for said called station to obtain a service on credit therefrom; said traffic means also receiving a signal indicating said service credit call thereat;

a credit center storing preselected credit intelligence pertinent to said calling station;

said traffic means responsive to said service credit call signal received thereat to interrupt said first circuit to disconnect said sending office means from said traffic means and to establish a second circuit including said traffic means and said credit center;

said traffic means further responsive to said second circuit connection and said calling station identifying signals recorded therein to activate said credit center through said second circuit to locate said credit intelligence pertinent to said calling station as stored in said credit center;

said traffic means additionally responsive to said called station identifying signals recorded therein to establish a third circuit including said credit center, said traffic means, said receiving office means, and said apparatus for delivering in said latter circuit said credit intelligence pertinent to to said calling station as located in said credit center to said apparatus for visual display thereon; and said called station responsive to said calling station credit intelligence displayed on said apparatus thereat to activate said traffic means to interrupt both said second and third circuits thereby to disconnect said credit center from said traffic means and to establish a fourth circuit including said traffic means, said calling and called stations and said sending and receiving office means to complete said call from said calling station to said called station for enabling said calling station to obtain said service on credit from said called station.

12. The combination according to claim 11 in which said sending office means includes signal producing means responsive to said predetermined signals originating at said calling station to transmit said service credit call signal in said first circuit to said traffic means for recording therein before said sending office means transmits said calling and called station number identifying signals in said first circuit for recording in said traffic means.

13. The combination according to claim 11 in which said traffic means includes a telephone set; said calling station operated to transmit signal O (operator) as said service credit call signal followed by said predetermined signals in said first circuit for activating said sending office means to interconnect therethrough said calling station and said traffic means set in said first circuit so that said latter station is energized to permit said calling station to transmit in said first circuit to said traffic means set a vocal signal indicating said service credit call and further so that said sending office means transmits in said first circuit to said traffic means said calling and called station identifying signals; said traffic means responsive to said vocal signal received thereat to interrupt said first circuit to disconnect said traffic means from said sending office means and to connect said traffic means to said credit center in said second circuit.

14. In combination with a telephone system comprising:

calling telephone station means;

called telephone station means; and traffic service position system means interposed between said calling and called station means to record signals identifying the numbers of said respective calling and called station means in response to a predetermined number of signals originating at said calling station means as a call for said called station means to obtain a service on credit therefrom; said traffic means also receiving a signal indicating said service credit call thereat;

a credit center storing preselected credit intelligence pertinent to said calling station means number;

said traffic means utilizing said calling station means number identifying signals recorded therein in response to said service credit call signal received at said traffic means for activating said credit center to locate therein said credit intelligence pertinent to said calling station means number;

said traffic means also utilizing said called station means number identifying signals recorded therein in response to said calling station means identifying signals received at said credit center to connect said credit center through said traffic means to said called station means for delivering thereto said credit intelligence pertinent to said calling station means number as located in said credit center; and said called station means responsive to said credit intelligence delivered thereto to activate said traffic means to disconnect said credit center therefrom and thereby from said called station means and to interconnect said calling and called station means to complete said call from said calling station means to said called station means for enabling said calling station means to obtain said service on credit from said called station means.

15. In a telephone credit circuit including a calling telephone station, a called telephone station, a traffic service position system, and a credit center storing preselected credit intelligence pertiment to said calling station, the method of enabling said calling station to obtain a service on credit through said traffic system from said called station as determined by said credit intelligence stored in said credit center, which method consists of:

recording signals identifying the numbers of said respective calling and called stations at said traffic system in response to an indication provided thereat of a call originating at said calling station and directed to said called station for obtaining said credit service therefrom;

connecting said credit center through said traffic system to said called station as predetermined by said credit service call indication provided at said traffic system and said respective calling and called station identifying numbers recorded therein for enabling said credit center to deliver therefrom said credit intelligence stored therein through said traffic system to said called station; and instructing said traffic system from said called station after evaluating said credit intelligence delivered thereto to connect said calling station through said traffic system to said called station thereby completing said credit service call for enabling said calling station to obtain said credit service from said called station and to interrupt the connection of said credit center to said traffic system thereby disconnecting said credit center from said called station.

16. The method according to claim 15 in which the recording of said signals identifying the numbers of said calling and called stations at said traffic system includes providing at said traffic system said credit service call indication as a class mark signal before the recording of said calling and called station identifying number signals thereat for predetermining the connection of said credit center to said traffic system thereby enabling said credit center to deliver said stored credit intelligence therefrom through said traffic system to said called station.

17. The method according to claim 15 in which the recording of said signals identifying the numbers of said calling and called stations at said traffic system includes recording at said traffic system said credit service call indication as an electric class mark signal before the recording of said calling and called station identifying number signals thereat for predetermining the connection of said credit center to said traffic system thereby enabling said credit center to deliver said stored credit intelligence therefrom through said traffic system to said called station.

18. The method according to claim 15 in which the recording of said signals identifying the numbers of said calling and called stations at said traffic system includes providing at said traffic system said credit service call indication as a vocal class mark signal before the recording of said calling and called station identifying number signals thereat for predetermining the connection of said credit center to said traffic system thereby enabling said credit center to deliver said stored credit intelligence therefrom through said traffic system to said called station.

19. The method according to claim 15 which includes the step of preselecting from said calling station an item available to said called station for delivery thereby to said calling station as said credit service after the connection of said calling station through said traffic system to said called station and thereby after the completion of said credit service call.

20. The method according to claim 15 which includes the steps of:

preselecting from said calling station a copy of an item available at said called station for delivery thereby to said calling station as said credit service after the connection of said calling station through said traffic system to said called station and thereby after the completion of said credit service call; and transmitting from said called station over the connection of said calling station through said traffic system to said called station electric signals related to said preselected item copy for reception at said calling station to represent said last-mentioned copy thereat.

21. In a telephone credit circuit including a calling telephone station, a called telephone station, a traffic service position system, and a credit center storing preselected credit intelligence pertinent to said calling station, the method of enabling said calling station to obtain a service on credit through said traffic system from said called station as determined by said credit intelligence stored in said credit center, which method consists of:

delivering said credit intelligence from said credit center through a connection thereof with said traffic system and thereby to said called station in accordance with identifying numbers of said calling and called stations recorded in said traffic system in response to an indication of a call received thereat and originating at said calling station for said called station to obtain said credit service therefrom; and instructing said traffic system from said called station after evaluating said credit intelligence delivered thereto to connect said calling station through said traffic system to said called station thereby completing said credit service call to obtain said credit service from said called station and to disconnect said credit center from said traffic system thereby terminating the delivery of said credit intelligence from said credit center through said traffic system to said called station.

22. The method according to claim 21 which includes the step of preselecting from said calling station a specific service available at said called station as said credit service to be obtained therefrom on the connection of said calling station through said traffic system to said called station and thereby after the completion of said credit service call.

* * * * *